United States Patent [19]

Forseth

[11] 4,136,975
[45] Jan. 30, 1979

[54] CARBON BLACK PELLETER

[75] Inventor: Glenn J. Forseth, Toledo, Ohio

[73] Assignee: Phillips Petroleum Company, Bartlesville, Okla.

[21] Appl. No.: 885,403

[22] Filed: Mar. 10, 1978

[51] Int. Cl.² .............................................. B01F 7/08
[52] U.S. Cl. ..................................... 366/325; 23/314; 425/222
[58] Field of Search ....................... 366/325, 326, 327; 425/222; 23/314

[56] References Cited

U.S. PATENT DOCUMENTS

| | | | |
|---|---|---|---|
| 3,525,122 | 8/1970 | Driscoll | 425/222 |
| 3,674,437 | 7/1972 | Austin | 366/327 |
| 3,825,233 | 7/1974 | Henderson | 366/327 |
| 4,065,240 | 12/1977 | Cole | 425/222 |

Primary Examiner—Edward J. McCarthy

[57] ABSTRACT

A carbon black pelleter is dislosed in which pins are affixed to a rotatable shaft and extend radially outwardly from the shaft in a plurality of helical flights. The pins are arranged such that upon rotation of the shaft the trace of a pin of a first helical flight overlaps the trace of a pin of a second azimuthally adjacent helical flight to produce narrow pellet size range.

20 Claims, 4 Drawing Figures

CARBON BLACK PELLETER

This invention relates generally to carbon black pelleters. More particularly this invention relates to a new and improved pelleter, the use of which produces a carbon black product of narrower particle size range. In another aspect, this invention relates to an improved agitator shaft for use in a carbon black pelleter.

The pelleting of carbon black is well known. In general, flocculent carbon black from the recovery system is pelleted to increase its density and facilitate its handling.

Pelleting is conducted by introducing particulate or flocculent black and a pelleting agent into a pelleter which usually comprises a horizontally elongated chamber through which a rotatably mounted shaft extends upon which pins are mounted which project radially outwardly into the elongated chamber. These pins are usually positioned along the shaft in a plurality of rows or flights which are formed in a helical pattern about the shaft. When the shaft is rotated within the chamber, the pins contact the carbon black to cause the formation of carbon black pellets.

The prior art carbon black pelleters produce a relatively broad range of pellet sizes. It is desirable, however, to narrow the range of pellet sizes produced by a pelleter in order to maximize the production of carbon black product within a specified size range. Extremely large carbon black pellets require an excessive amount of energy to grind the carbon black up for its end use such as in rubber manufacture, while fines are difficult to handle and can cause hazardous breathing air conditions if their presence is not minimized. It is customary to recycle both the oversize pellets and the undersize pellets and fines produced by a pelleter for reprocessing. Thus, the narrowing of the size range of pellets produced by a pelleter to increase the percentage of pellets within the specified range can achieve increased efficiency in the production of carbon black pellets.

Accordingly, it is an object of the invention to provide means for achieving increased efficiency in the production of carbon black pellets.

Another object of the invention is to provide improved apparatus for producing carbon black pellets in a narrow size range.

Yet another object of the invention is to provide an improved carbon black pelleter for the production of carbon black pellets.

Still another object of the invention is to provide an improved agitator shaft for use in a carbon black pelleter.

Another object of the invention is to provide a method of producing carbon black pellets in a narrow size range.

According to the invention, a novel agitator shaft is provided upon which a plurality of radially outwardly extending pins are mounted in a plurality of helical flights disposed along the shaft. The pins are so arranged that upon rotation of the shaft the trace of a revolving pin of one helical flight overlaps the trace of a revolving pin of a next azimuthally adjacent helical flight. In another aspect of the invention, an improved carbon black pelleter is provided which comprises a shell with the novel agitator shaft rotatably supported therein and means for rotating the shaft and revolving the pins in the shell. In still another aspect of the invention, a novel method of producing carbon black pellets in a narrow size range is provided.

Other aspects and objects of the invention will be evident from the following detailed description when read in conjunction with the accompanying drawings in which.

Figure 2:
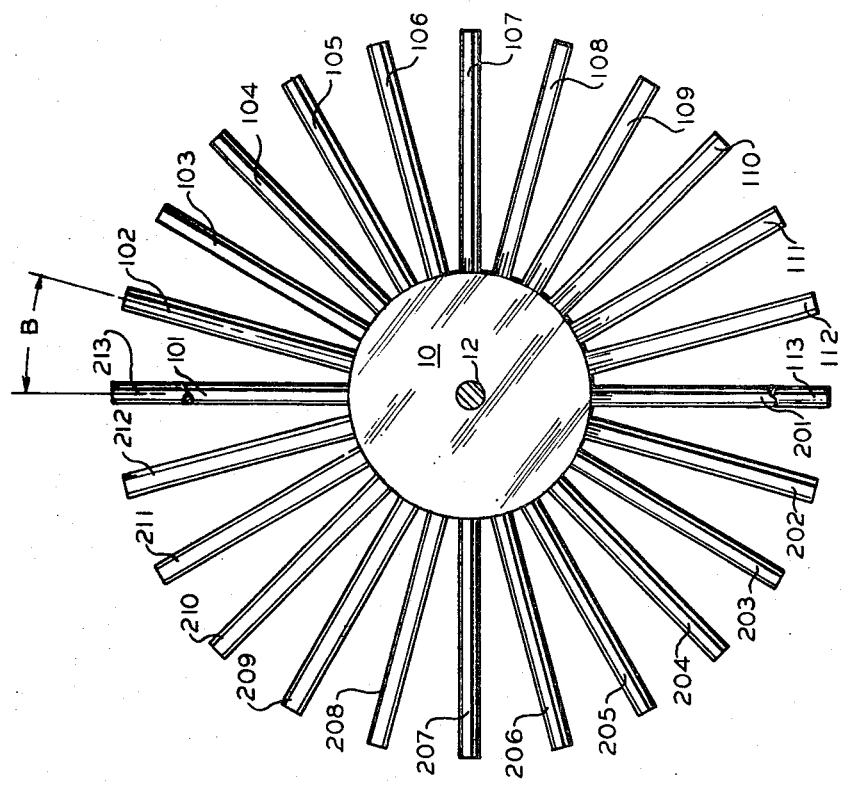
FIG. 2 is a cross-sectional view of the pelleter shaft taken along line 2—2 of FIG. 1 with portions of some pins broken away to more clearly illustrate the structure.
Figure 1:
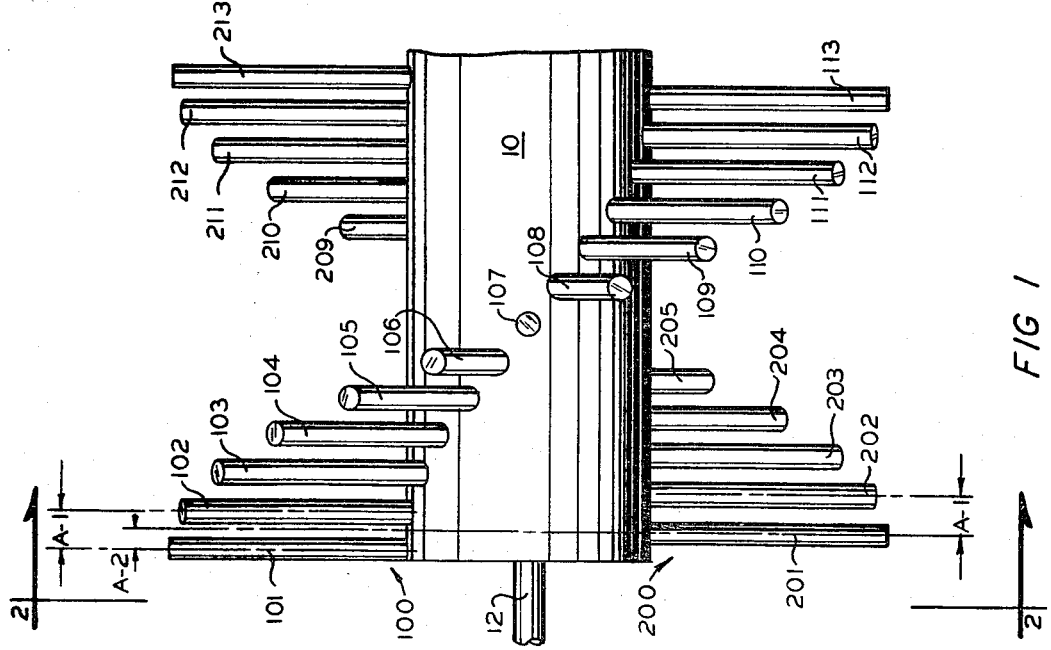
FIG. 1 is a partial side elevation view of the pelleter shaft.
Figure 3:
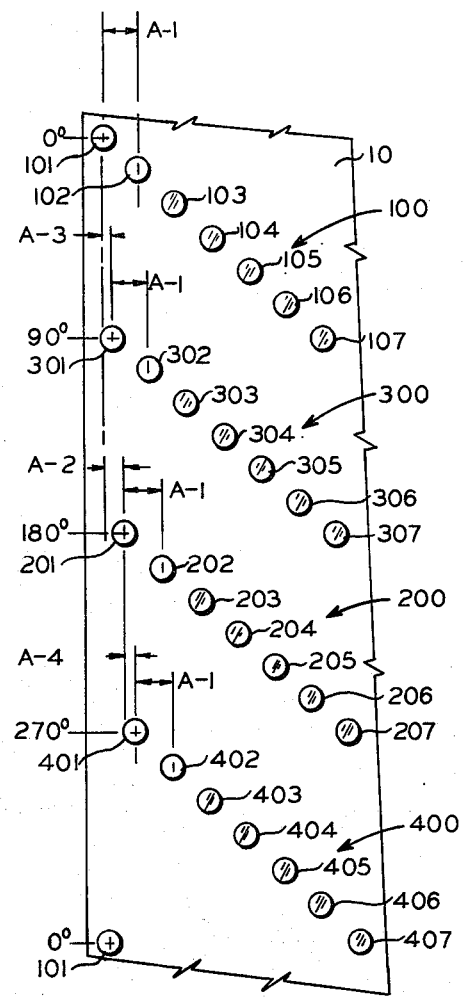
FIG. 3 is a planar view of an alternate embodiment of the cylindrical outer surface of the shaft illustrating the orientation and spacing of four helical flights of pins thereon.
Figure 4:
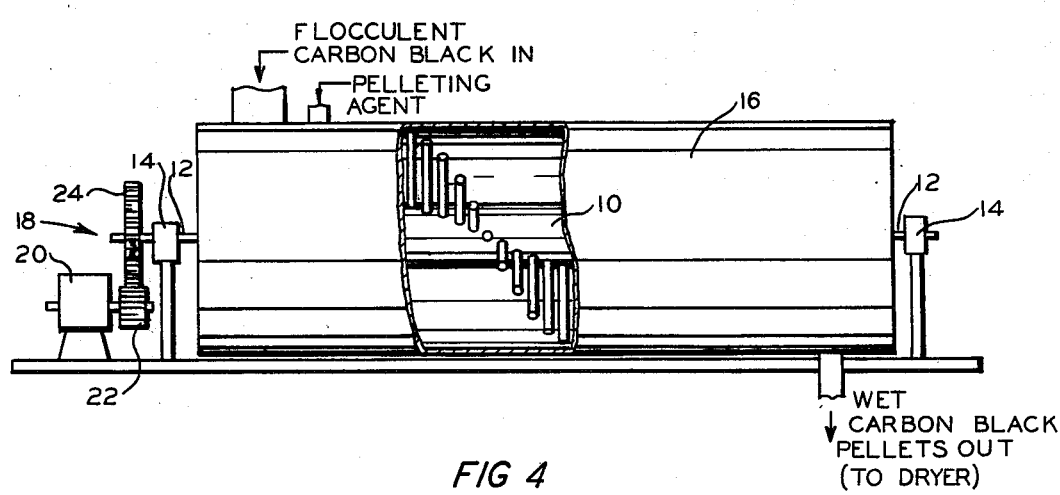
FIG. 4 is a side elevation view of the pelleter with a portion of the chamber broken away to show the pelleter shaft therein.

Referring now to the drawings, and to FIGS. 1, 2 and 4 in particular, there is shown a portion of a pelleter or agitator shaft 10 which is provided at its opposite ends 12 with suitable bearings 14 for rotatable support of the shaft within a shell defining an elongated chamber 16. The shaft 10 is rotated within the chamber 16 by suitable means 18 such as a drive motor 20 in meshed engagement with the shaft via spur gears 22 and 24. A plurality of pins are located along the length of the shaft 10 and extend radially outwardly therefrom. The pins are arranged in helical rows or flights positioned around the shaft 10. In the apparatus disclosed in FIGS. 1 and 2, two helical flights of pins are illustrated which are generally designated by the reference characters 100 and 200. In the alternate structure illustrated in FIG. 3, two additional flights of pins are illustrated therein and are generally designated by the reference characters 300 and 400. The pins of each flight are respectively designated by the reference characters 101, 102, 103, etc, 201, 202, 203, etc., 301, 302, 303, etc. and 401, 402, 403, etc.

A suitable shell or chamber can be constructed which has a length of approximately 80 inches (203.2 centimeters) and an inside diameter of 19.5 inches (49.5 centimeters). The pelleter shaft 10 has an outside diameter of approximately 6.625 inches (16.8 centimeters) and the pins have a diameter of approximately 0.625 inch (1.6 centimeters). The radial clearance between the tips of the pins and the inner surface of the shell is approximately 0.187 inch (0.47 centimeters). The tips of the pins can be the conventional chisel-tip or other desired configuration.

The axial centerline-to-centerline spacing of azimuthally adjacent pins in each helical flight is greater than the axial distance between the upstream and downstream edges of each pin and is less than twice the axial distance between the upstream and downstream edges of each pin. The upstream and downstream edges of each pin lie in a respective plane normal to the axis of the shaft 10. When cylindrically shaped pins are employed, the centerline-to-centerline axial spacing of azimuthally adjacent pins in the helical flight is greater than the diameter of a pin and less than twice the diameter of a pin. More preferably, the centerline-to-centerline axial spacing of azimuthally adjacent pins of a helical flight is 1.6 times the diameter of a cylindrical pin. The centerline-to-centerline axial spacing of azimuthally adjacent pins of a flight is shown as dimension A-1 in FIGS. 1 and 3. This axial spacing arrangement is identical in flights 100, 200, 300, and 400.

Each pin of helical flight 100 has a corresponding pin in helical flight 200 displaced about the axis of the shaft through an angle of 180°. Pin 101 in helical flight 100 has a corresponding pin 201 in helical flight 200. Similarly, pin 102 of helical flight 100 has a corresponding pin 202 in helical flight 200. This relationship continues throughout the length of all the helical flights 100, 200, 300, and 400. Each pin of helical flight 100 is axially spaced along the shaft 10 from a corresponding pin of helical flight 200 a centerline-to-centerline distance less than the axial spacing dimension A-1 and preferably one-half the axial spacing dimension A-1. This spacing dimension is illustrated in FIGS. 1 and 3 and is designated by the reference character A-2.

In the embodiment illustrated in FIG. 3, four helical flights of pins are mounted on the shaft. Helical flight 300 is positioned angularly intermediate helical flights 100 and 200 with pin 301 being angularly displaced about the axis of the shaft through an angle of 90° from corresponding pin 101 of helical flight 100. The centerline-to-centerline axial spacing between corresponding pins 101 and 301 of helical flights 100 and 300 is less than the centerline-to-centerline spacing A-2 and is preferably one-half the spacing dimension A-2, and is designated by the reference character A-3 in FIG. 3. Similarly, the centerline-to-centerline axial spacing between the corresponding pins 201 and 401 of helical flights 200 and 400 is also less than the centerline-to-centerline spacing dimension A-2 and is preferably one-half the spacing dimension A-2. This latter spacing dimension is designated by the reference character A-4 in FIG. 3.

The angular displacement about the axis of the shaft 10 between azimuthally adjacent pins of each helical flight can be any desired angle, however it is preferred that the angle between azimuthally adjacent pins of a helical flight be 15° as shown at B in FIG. 2.

It should be understood that, in a preferred embodiment, the axial spacing dimension A-1 is approximately 1.6 times the diameter of a cylindrically shaped pin while the axial spacing dimension A-2 is approximately 0.8 times the diameter of a pin. In the embodiment of FIG. 3, the axial spacing dimensions A-3 and A-4 are both preferably 0.4 times the diameter of a pin. In the event pins having noncircular cross-section are employed, the axial distance between the upstream edge and downstream edge of a pin can be substituted for the diameter of the cylindrical pin to calculate the preferred axial spacing dimensions A-1, A-2, A-3, and A-4.

In summary, the shaft of this invention contains a plurality of pins positioned in at least two helical flights encircling the shaft, the successive or azimuthally adjacent pins in the same helical flight being positioned approximately 1.6 times the pin diameter axially apart when the pins are considered as positioned along the longitudinal axis of the shaft. When two helical flights are employed on a shaft, the pins of the second flight are axially displaced relative to the pins of the first flight by approximately 0.8 times the pin diameter. When four helical flights of pins are mounted on the shaft, the pins of each flight are preferably axially displaced relative to the pins of the next adjacent flight by 0.4 times the pin diameter. When so constructed, upon rotation of the shaft the trace of a revolving pin of a first helical flight overlaps the trace of a revolving pin of a next azimuthally adjacent helical flight to produce narrow carbon black pellet size range.

The apparatus of this invention is employable under those conditions employed in the prior art, including pelleting agents, speed of rotation and the like. In the employment of the pelleter of the present invention, the overlapping relation of the pins results in the entire bed of carbon black being contacted by one or more diametrically opposed helical flights of pins as the pins are turned or revolved into the bed. Since, as clearly shown in the drawings, there is no axial spacing between the traces of pins when revolved, but there is rather substantial overlap between the traces of the revolving pins, there is no segment of the bed which escapes pin contact on each successive revolution of the pins through the bed. For this reason, inasmuch as all carbon black is assured of being contacted by the pins, a more uniform pelleting of the carbon black results. Also, the "overlap" of revolving pin traces minimizes carbon black cake laydown on the inner periphery of chamber 16, minimizing the possibility of large chunks of cake breaking off and exiting with the pellets.

In operation, the shaft 10 is rotated within the chamber 16 by the drive means 18, as shown in FIG. 4. Carbon black in flocculent form is introduced along with a suitable pelletizing agent, such as water, through an inlet into one end portion or upstream end portion of the chamber 16. The carbon black and pelleting agent are agitated by the pins carried on the rotating shaft 10 and revolved thereby within the chamber. The carbon black pellets produced within the chamber exit therefrom through an outlet from the opposite or downstream end portion of the chamber.

EXAMPLE I

A pelleter was constructed comprising a chamber having a length of 80 inches (203.20 cm.) and an inside diameter of 19.5 inches (49.53 cm.) and a pelleter shaft rotatably supported within the chamber and having an outside diameter of 6.625 inches (16.83 cm.). A plurality of pins were mounted on the shaft in two helical flights angularly displaced 180° apart about the axis of the shaft. The angle about the axis of the shaft between azimuthally adjacent pins in each helical flight was 15°. The axial length of each helical flight from the first to the last pin was 62 inches (157.48 cm.). The diameter of each pin was 0.625 inch (1.59 cm.) and the length of each pin was 6.25 inches (15.88 cm.). The centerline-to-centerline axial spacing of azimuthally adjacent pins to each helical flight was 1.0 inch (2.54 cm.). The centerline-to-centerline axial spacing between corresponding axially adjacent pins on the two helical flights was 0.5 inch (1.27 cm.). Clearance between the conventional chisel-tip ends of the pins and the cylindrical inner surface of the chamber was 0.1875 inch (0.476 cm.). Flocculent type N-762 carbon black was introduced into the chamber at the rate of 1900 pounds per hour (855 Kg/hr.) along with a pelleting fluid consisting of water and 1.0 weight percent calcium lignin sulfonate at a rate of 1070 pounds per hour (481.5 Kg/hr.), with a shaft rotational speed of 360 revolutions per minute and at a pelleting temperature of 150° F. (65.6° C.). Pellet distribution was obtained in accordance with ASTM D 1511-74 and is listed below in Table I.

TABLE I

| Dried Pellet Analysis | Weight Percent |
|---|---|
| On 10 mesh | 2 |
| On 18 mesh | 43 |
| On 35 mesh | 45 |
| On 60 mesh | 8 |
| On 120 mesh | 1 |
| In Pan mesh | 1 |
| Total | 100 |

Thus it will be seen that a carbon black pelleter constructed and operated in accordance with the present invention produces carbon black pellets of a relatively uniform size such that about 96 weight percent of the total carbon black pellets so produced fall within the desired range of 18 to 60 mesh.

Changes may be made in the construction and arrangement of parts or elements of the various embodiments disclosed herein without departing from the spirit and scope of the invention as defined in the following claims.

What is claimed is:

1. A carbon black pelleter comprising:
   a shell;
   a shaft rotatably supported in the shell;
   means for rotating said shaft in said shell; and
   a plurality of pins each having an upstream and downstream edge and mounted on said shaft and projecting radially therefrom, said pins being positioned in a plurality of rows defining helical flights positioned along the length of the shaft, said pins being arranged such that azimuthally adjacent pins in each helical flight are axially spaced along the shaft a distance greater than the axial distance between the upstream and downstream edges of each pin and less than twice the axial distance between the upstream and downstream edges of each pin, each pin of a first helical flight of pins being axially spaced along the shaft an axial distance from a corresponding pin of a second helical flight of pins angularly displaced therefrom about the axis of the shaft through an angle of 180°, said last mentioned axial distance being less than the axial spacing between azimuthally adjacent pins of a helical flight.

2. A carbon black pelleter as defined in claim 1 wherein the axial spacing distance between corresponding pins of the first and second helical flights is further defined as being equal to one-half the axial spacing between azimuthally adjacent pins of a helical flight.

3. A carbon black pelleter as defined in claim 1 wherein the axial spacing between corresponding pins of the first and second helical flights is such that the downstream edge of a first pin of the first helical flight lies in a first plane normal to the axis of the shaft, the upstream edge of a corresponding pin of the second helical flight lies in a second plane normal to the axis of the shaft and spaced an axial distance upstream from the first plane, the downstream edge of the corresponding pin of the second helical flight lies in a third plane normal to the axis of the shaft, and the upstream edge of a second pin of the first helical flight azimuthally adjacent to and downstream from the first pin of the first helical flight lies in a fourth plane normal to the axis of the shaft and spaced an axial distance upstream from the third plane.

4. A carbon black pelleter as defined in claim 1 wherein the pins are substantially cylindrical shaped and have a diameter, the axial spacing between azimuthally adjacent pins of each helical flight being about 1.6 times the diameter of a pin, the axial spacing between corresponding pins of the first and second helical flights relatively displaced about the axis of the shaft through an angle of 180° being about 0.8 times the diameter of a pin.

5. A carbon black pelleter as defined in claim 1 wherein the azimuthally adjacent pins of each helical flight are angularly displaced one from the other about the axis of the shaft through an angle of 15°.

6. A carbon black pelleter as defined in claim 1 characterized further to include:
   a third helical flight of pins positioned between the first and second flights, each pin of the first helical flight of pins being axially spaced along the shaft an axial distance from a corresponding pin of the third helical flight angularly displaced therefrom about the axis of the shaft through an angle of 90°, said last-mentioned axial distance being less than one-half the axial spacing between azimuthally adjacent pins of a helical flight; and
   a fourth helical flight of pins positioned between the first and second flights, each pin of the second helical flight of pins being axially spaced along the shaft an axial distance from a corresponding pin of the fourth helical flight angularly displaced therefrom about the axis of the shaft through an angle of 90°, said last-mentioned axial distance being less than one-half the axial spacing between azimuthally adjacent pins of a helical flight.

7. A carbon black pelleter as defined in claim 6 wherein the axial spacing distance between corresponding pins of the first and third helical flights and the axial spacing distance between corresponding pins of the second and fourth helical flights is further defined as being equal to one-fourth the axial spacing between azimuthally adjacent pins of a helical flight.

8. A carbon black pelleter as defined in claim 6 wherein the pins are substantially cylindrically shaped, the axial spacing between azimuthally adjacent pins of each helical flight being about 1.6 times the diameter of a pin, the axial spacing between corresponding pins of the first and third helical flights relatively displaced about the axis of the shaft through an angle of 90° being about 0.4 times the diameter of a pin, the axial spacing between corresponding pins of the first and second helical flights relatively displaced about the axis of the shaft through an angle of 180° being about 0.8 times the diameter of a pin, and the axial spacing between corresponding pins of the second and fourth helical flights relatively displaced about the axis of the shaft through an angle of 90° being about 0.4 times the diameter of a pin.

9. A carbon black pelleter as defined in claim 6 wherein the azimuthally adjacent pins of each helical flight are angularly displaced one from the other about the axis of the shaft through an angle of 15°.

10. An agitator for use in a carbon black pelleter or the like, comprising:
    a shaft; and
    a plurality of pins each having an upstream and downstream edge and mounted on said shaft and projecting radially therefrom, said pins being positioned in a plurality of rows defining helical flights positioned along the length of the shaft, said pins being arranged such that azimuthally adjacent pins in each helical flight are axially spaced along the shaft a distance greater than the axial distance between the upstream and downstream edges of each pin and less than twice the axial distance between the upstream and downstream edges of each pin, each pin of a first helical flight of pins being axially spaced along the shaft an axial distance from a corresponding pin of a second helical flight of pins angularly displaced therefrom about the axis of the shaft through an angle of 180°, said last mentioned axial distance being less than the axial spacing between azimuthally adjacent pins of a helical flight.

11. An agitator as defined in claim 10 wherein the axial spacing distance between corresponding pins of the first and second helical flights is further defined as being equal to one-half the axial spacing between azimuthally adjacent pins of a helical flight.

12. An agitator as defined in claim 10 wherein the axial spacing between corresponding pins of the first and second helical flights is such that the downstream edge of a first pin of the first helical flight lies in a first plane normal to the axis of the shaft, the upstream edge of a corresponding pin of the second helical flight lies in a second plane normal to the axis of the shaft and spaced an axial distance upstream from the first plane, the downstream edge of the corresponding pin of the second helical flight lies in a third plane normal to the axis of the shaft, and the upstream edge of a second pin of the first helical flight azimuthally adjacent to and downstream from the first pin of the first helical flight lies in a fourth plane normal to the axis of the shaft and spaced an axial distance upstream from the third plane.

13. An agitator as defined in claim 10 wherein the pins are substantially cylindrically shaped and have a diameter, the axial spacing between azimuthally adjacent pins of each helical flight being about 1.6 times the diameter of a pin, the axial spacing between corresponding pins of the first and second helical flights relatively displaced about the axis of the shaft through an angle of 180° being about 0.8 times the diameter of a pin.

14. An agitator as defined in claim 13 wherein the azimuthally adjacent pins of each helical flight are angularly displaced one from the other about the axis of the shaft through an angle of 15°.

15. An agitator as defined in claim 10 characterized further to include:
a third helical flight of pins positioned between the first and second flights, each pin of the first helical flight of pins being axially spaced along the shaft an axial distance from a corresponding pin of the third helical flight angularly displaced therefrom about the axis of the shaft to an angle of 90°, said last-mentioned axial distance being less than one-half the axial spacing between azimuthally adjacent pins of a helical flight; and
a fourth helical flight of pins positioned between the first and second flights, each pin of the second helical flight of pins being axially spaced along the shaft an axial distance from a corresponding pin of the fourth helical flight angularly displaced therefrom about the axis of the shaft through an angle of 90°, said last-mentioned axial distance being less than one-half the axial spacing between azimuthally adjacent pins of a helical flight.

16. An agitator as defined in claim 15 wherein the axial spacing distance between corresponding pins of the first and third helical flights and the axial spacing distance between corresponding pins of the second and fourth helical flights is further defined as being equal to one-fourth the axial spacing between azimuthally adjacent pins of a helical flight.

17. An agitator as defined in claim 15 wherein the pins are substantially cylindrically shaped and have a pin diameter, the axial spacing between azimuthally adjacent pins of each helical flight being about 1.6 times the pin diameter, the axial spacing between corresponding pins of the first and third helical flights relatively displaced about the axis of the shaft through an angle of 90° being about 0.4 times the pin diameter, the axial spacing between corresponding pins of the first and second helical flights relatively displaced about the axis of the shaft through an angle of 180° being about 0.8 times the pin diameter, and the axial spacing between corresponding pins of the second and fourth helical flights relatively displaced about the axis of the shaft through an angle of 90° being about 0.4 times the pin diameter.

18. An agitator as defined in claim 17 wherein the aximuthally adjacent pins of each helical flight are angularly displaced one from the other about the axis of the shaft through an angle of 15°.

19. A method of making carbon black pellets from particulate carbon black comprising the steps of:
introducing particulate carbon black into a chamber;
introducing a pelleting agent into said chamber with said carbon black;
revolving a plurality of radially extending pins about an axis within said chamber, said revolving pins being arranged in a plurality of helical flights along the axis such that the trace generated by a revolving pin of a first helical flight overlaps the trace generated by a revolving pin of another helical flight displaced 180° about the axis from the first helical flight to agitate said carbon black and said pelleting agent so as to form carbon black pellets; and
withdrawing the resulting carbon black pellets from said chamber.

20. A method as defined in claim 19 wherein the trace generated by each revolving pin of a helical flight overlaps the trace generated by at least one revolving pin of another helical flight to agitate said carbon black and said pelleting agent to form carbon black pellets.

* * * * *